(12) United States Patent
Hoffeld

(10) Patent No.: US 6,502,678 B1
(45) Date of Patent: Jan. 7, 2003

(54) HYDRODYNAMIC CLUTCH

(75) Inventor: Harald Hoffeld, Crailsheim (DE)

(73) Assignee: Voith Turbo GmbH & Co. KG (DE)

( * ) Notice: Subject to any disclaimer, the term of this patent is extended or adjusted under 35 U.S.C. 154(b) by 0 days.

(21) Appl. No.: 09/831,324

(22) PCT Filed: Sep. 6, 2000

(86) PCT No.: PCT/EP00/08705

§ 371 (c)(1),
(2), (4) Date: Jun. 26, 2001

(87) PCT Pub. No.: WO01/18429

PCT Pub. Date: Mar. 15, 2001

(30) Foreign Application Priority Data

Sep. 7, 1999 (DE) .......................... 199 42 578

(51) Int. Cl.$^7$ .............................................. F16H 45/02
(52) U.S. Cl. ................................ 192/3.31; 192/105 BA
(58) Field of Search ............................... 192/3.28, 3.31, 192/105 BA, 103 B

(56) References Cited

U.S. PATENT DOCUMENTS

| | | | | |
|---|---|---|---|---|
| 2,034,757 A | * | 3/1936 | Herreshoff | 192/3.31 |
| 2,055,300 A | | 9/1936 | Maurer | 192/48 |
| 2,380,734 A | * | 7/1945 | Eastin | 192/3.31 |
| 2,613,782 A | * | 10/1952 | Maurer | 192/3.31 X |
| 3,519,112 A | * | 7/1970 | Verzolla | 192/3.31 |
| 4,037,691 A | * | 7/1977 | Ivey | 192/3.31 |
| 4,113,075 A | * | 9/1978 | Walker | 192/3.31 |
| 4,140,210 A | | 2/1979 | Schulz | 192/103 |
| 4,690,257 A | | 9/1987 | Suzuki et al. | 192/3.31 |
| 4,972,736 A | * | 11/1990 | Koshimo | 192/105 BA X |

FOREIGN PATENT DOCUMENTS

| | | | |
|---|---|---|---|
| DE | 374259 | 4/1923 | |
| DE | 479119 | 7/1929 | |
| DE | 1775184 | 9/1971 | |
| DE | 2245901 | 4/1974 | |
| DE | 3917986 | 8/1990 | |
| DE | 4011973 | 1/1991 | ..................... 47/6 |
| DE | 4444242 | 6/1995 | |
| FR | 831078 | 8/1938 | |
| FR | 2166464 | 8/1973 | |
| FR | 2561342 | 9/1985 | |
| GB | 1247912 | 9/1971 | |
| WO | 8204107 | 11/1982 | .................. 43/284 |

OTHER PUBLICATIONS

Shinko Engineering Co., Ltd. "Shinko Fluid Couplings", EFK.012 1 100782T, pp 3–4.
New Turbostart SRL, "Hydromechanical Couplings", Cat. 1188, pp 2–11.
Translation of German Patent No. 374259 Issued Apr. 21, 1923.
Translation of German Patent No. 479119 Issued on Jul. 9, 1929.
Translation of German Patent No. 2245901 Issued on Apr. 4, 1974.
Translation of German Patent No. 4444242 Issued on Jun. 29, 1995.

* cited by examiner

Primary Examiner—Richard M. Lorence
(74) Attorney, Agent, or Firm—Ostrolenk, Faber, Gerb & Soffen, LLP

(57) ABSTRACT

The invention relates to a hydrodynamic clutch (1) comprising at least two impellers, as outer wheel (3), and an inner wheel (3). The inner wheel is equipped with an integrated synchronizer clutch (2) and is enclosed by a clutch shell (4) that is coupled to said outer wheel. The invention is characterized in that the clutch elements (6.1, 6.2) are formed by the inner wheel and by the clutch shell. Said inner wheel comprises at least two segments (8.1, 8.2, 8.3) that are displaceably mounted in a radial direction.

13 Claims, 4 Drawing Sheets

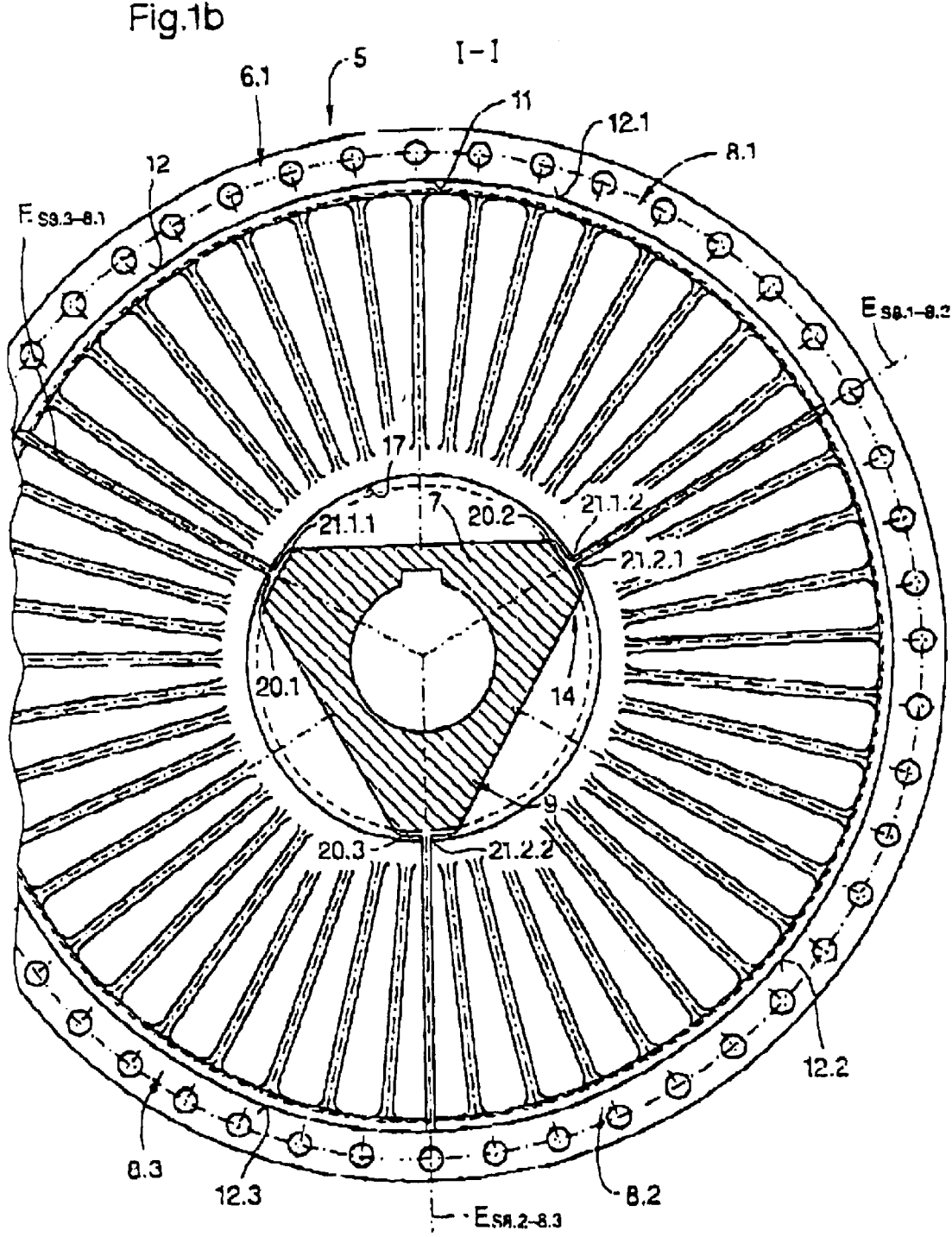

HYDRODYNAMIC CLUTCH

Figure 1A:
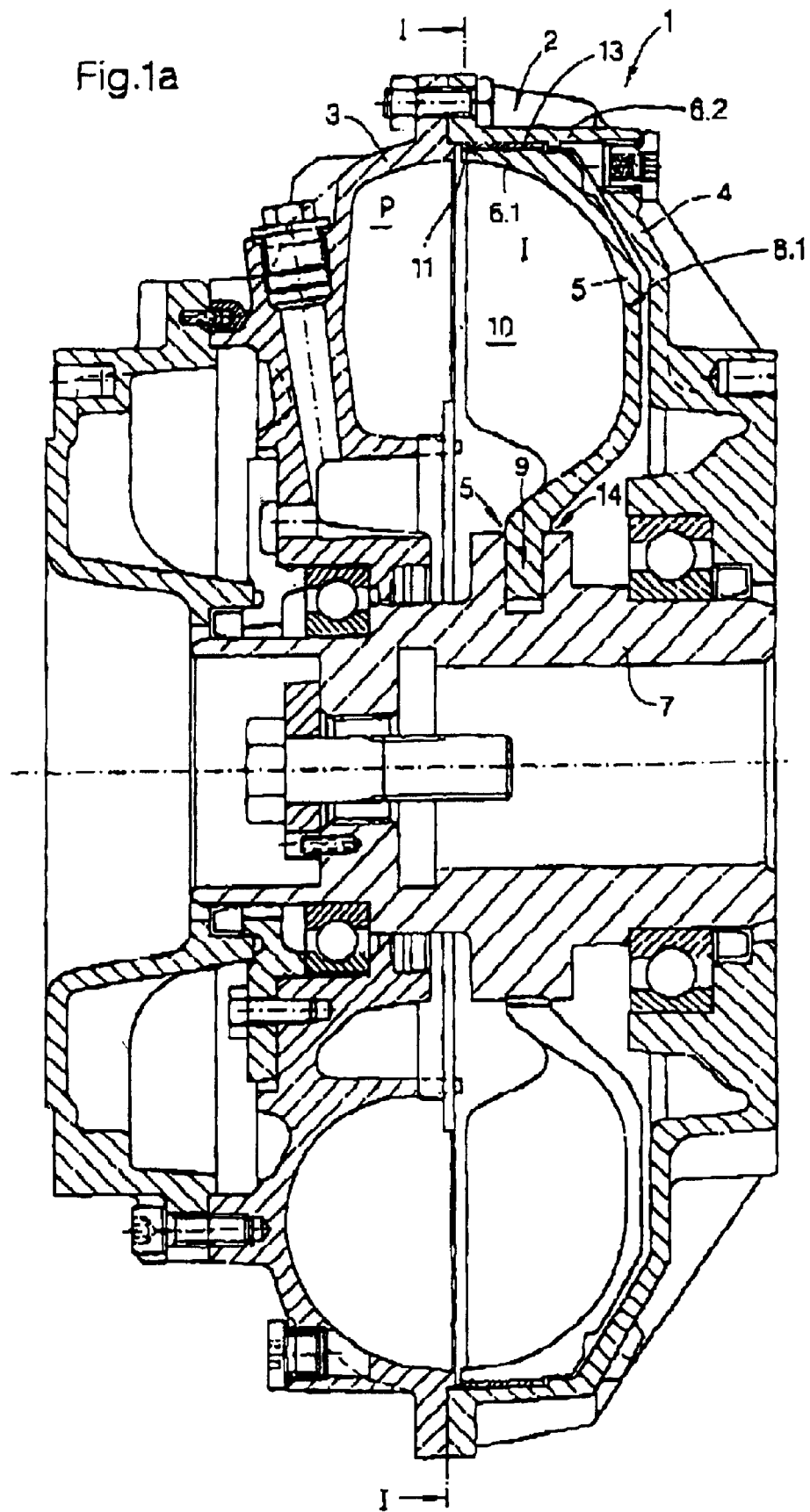

The invention relates to a hydrodynamic coupling, in particular a hydraulic transmitter, specifically having the features from the preamble of claim 1.

A wide range of designs of hydrodynamic couplings with clutches for synchronization, in particular in the form of friction clutches actuated by centrifugal forces, are known. As a representative sample in this context, reference is made to the following documents:

1. DE 31 19 171
2. Shinko Engineering Co., LTD "Shinko Fluid Couplings", EFK.012 1 100782T
3. "Hydromechanical Couplings"
4. DE 17 75 184

Each of these embodiments comprises a hydrodynamic coupling, in particular a hydraulic transmitter, which operates on the basis of the Föttinger principle and in which, by means of a pump impeller, mechanical energy in the form of rotational energy of the drive shaft, is converted into kinetic energy, i.e. flow energy of the operating medium, this flow energy, on the output side, being converted back into rotational energy by a further bucket wheel. The operating medium used is primarily oil, and in some special cases also water.

Hydrodynamic couplings of this type substantially comprise at least three parts, two bucket wheels, one outer wheel and one inner wheel which is enclosed by a coupling shell which is coupled to the outer wheel. The function of the bucket wheels as pump impeller and turbine wheel is generally dependent on the direction of power transmission, taking the direction of rotation into account. If the pump impeller is driven, i.e. the outer wheel or the inner wheel, a circuit of the operating medium is formed in the radial and axial planes in the toroidal working space between outer wheel and inner wheel. In the process, a circumferential force, which transmits the torque, and additionally an axial force are active. The circuit is maintained for as long as there is a difference in torque in the form of what is known as the slip S between the drive side and the output side. If both bucket wheels are running synchronously, the circuit breaks up and no further torque is transmitted. In this case, a hydrodynamic coupling, in nominal operation, is generally designed for 2 to 3 percent slip, i.e. the efficiency is then approximately 97 to 98 percent. To improve the efficiency, it is necessary to connect a friction clutch in parallel. In order, however, to maintain the start-up properties of the hydrodynamic coupling which are particularly advantageous on account of the hydrodynamic power transmission, in particular the property of gentle acceleration of extremely large masses with virtually zero wear, this friction clutch may only be shifted with a low slip. The design of the parallel circuit of the friction clutch and its arrangement or association with respect to the hydrodynamic coupling is known, in various designs, from the above-mentioned documents. In the design described in document DE 31 19 171, the friction clutch comprises two clutch halves, which can be actuated by a fluid pressure which is dependent on centrifugal force. In this case, a shift element which actuates the clutch, preferably a piston which can be displaced in the axial direction and a pressure chamber, which can be filled with liquid and in which, during rotation, a fluid pressure which is dependent on centrifugal force and acts to close the clutch, is built up, rotates with one half of the clutch. For this purpose, a reservoir which is separate from the shift element is provided in said clutch half, this reservoir being connected to the pressure chamber via at least one fluid line. A control element controls the degree of filling of the pressure chamber with liquid as a function of the rotational speed of the said clutch half. In this case, with the reservoir arranged closer to the axis of rotation of the clutch than the pressure chamber, the end faces which delimit the pressure space are matched to one another in such a manner that the volume of the pressure chamber adopts a value of virtually zero when the clutch is open. When a clutch of this type is coupled to a hydrodynamic coupling, the secondary shaft, that is to say the shaft which is connected to the turbine wheel, is connected to one half of the friction clutch. When the clutch is closed, the pump impeller and turbine wheel of the hydrodynamic coupling rotate synchronously. In this embodiment, the synchronizer clutch is arranged outside the hydrodynamic coupling and has to be coupled to the latter in a corresponding way, which means that the structural size taken up is considerably increased in the axial direction and, in addition, the structural outlay is considerably increased.

In the embodiments described in the documents listed under 2 to 4, the synchronizer clutch, which is designed as a friction clutch, is integrated in the hydrodynamic coupling or forms a structural unit therewith. In the document mentioned under 2, the outer wheel is assigned the function of the pump impeller and the inner wheel is assigned the function of the turbine wheel. The coupling shell, which encloses the turbine wheel is designed to be extended in the axial direction and is used as a drum, in which centrifugal weights rotate, which are driven by driver elements on the inner wheel. In addition to the increased need for space, a considerable drawback is the particular design of the inner wheel, which has to be equipped with driver elements for the centrifugal weights, and this has to be taken into account even during production of the inner wheel, in design and in selecting the material used. The driver elements are in this case, according to the proposed solution, screwed to the inner wheel, which also considerably increases outlay on assembly. Furthermore, it is impossible to rule out operating disruption, since during operation loosening of the screw connections can cause considerable damage.

In the coupling designs which are described in the documents listed under 3 and 4, the inner wheel is assigned the function of the pump impeller and the outer wheel is assigned the function of the turbine wheel. In this case too, the synchronizer clutch is integrated in an elongated region of one of the elements, in particular of the inner wheel, by this elongated region being designed as a drum in which centrifugal weights rotate, but these weights are driven by driver elements on the outer wheel, in particular the turbine wheel. This solution also takes up considerable amounts of space in the axial direction in its installed position. The extended region has to be taken into account when producing the pump impeller, either requiring a single-part design when producing the casting or having to be connected to the pump impeller via an additional material-to-material bond. In the other case, corresponding connecting elements are to be provided, with the result that an increased outlay on assembly is to be noted in addition to the outlay on manufacturing technology.

The hydrodynamic couplings with synchronizer clutches—either associated or integrated—which are known in the prior art all have the drawback that the structural length in the axial direction is increased considerably compared to a conventional hydrodynamic coupling without synchronization. Further drawbacks are the increased structural outlay, manufacturing outlay and installation outlay, with considerably increased costs as a result. Furthermore, on account of the connections which have to be produced between the individual elements when integrating the synchronizer clutch in the hydrodynamic coupling, it is impossible to rule out the possibility of malfunctioning or disruption as arise in the event of the driver elements and therefore also the centrifugal bodies coming loose, which may lead to substantial, and in some cases even irreparable, damage to the individual elements.

The invention is therefore based on the object of further developing a hydrodynamic coupling of the type described in the introduction with a synchronizer clutch in such a manner that the above-mentioned drawbacks are avoided. In particular, the aim is to find a solution which is distinguished by a low structural outlay, small overall size, low manufacturing and assembly outlay and therefore low costs. However, in functional terms there are to be no restrictions compared to the hydrodynamic couplings which are known from the prior art.

The solution according to the invention is characterized by the features of claim 1. Advantageous configurations are described in the subclaims.

In a hydrodynamic coupling comprising at least two bucket wheels—one outer wheel and one inner wheel which is enclosed by a coupling shell which can be coupled to the outer wheel—there is an integrated synchronizer clutch, the latter having at least a first clutch element and a second clutch element, which can be operatively connected to one another in a frictionally locking manner at least indirectly, the two elements being formed by elements of the hydrodynamic coupling, in particular the inner wheel and the coupling shell. For this purpose, the inner wheel has at least two segments, which form centrifugal bodies which, as a function of the centrifugal force, allow a frictional lock between the inner wheel or the individual segments of the inner wheel, also referred to as inner-wheel segments, and the coupling shell. The individual segments of the inner wheel are for this purpose guided in such a manner that they can be moved or displaced at least in the radial direction, but in the circumferential direction, in the direction of rotation, can be connected in a rotationally fixed manner to an element which can be connected to the drive side or the output side.

There are numerous possibilities in terms of the design of the inner wheel or of the individual segments. In the most simple case, the segments are provided by dividing the inner wheel into a plurality of segments, which can all be coupled to the drive or output in such a manner that they can be displaced in the radial direction but are rotationally fixed in the circumferential direction. The division of the inner wheel always takes place in the vaned region of the inner wheel in the circumferential direction, so that when the segments are arranged in rows against one another in the circumferential direction, the structural unit of the inner wheel is formed.

The solution according to the invention makes it possible in a simple manner to integrate a synchronizer clutch into a hydrodynamic coupling, the integration not requiring any additional space whatsoever compared to a conventional hydrodynamic coupling without a synchronizer clutch, so that if necessary it can be retrofitted in drive systems with a hydrodynamic coupling without, for example, increasing the overall length. In addition to the fact that the overall length is kept the same in the axial direction as that of a conventional design without synchronizer clutch, the number of components required also scarcely rises. The structural and manufacturing outlay is low. The costs of a coupling of this type are low. The synchronizer clutch takes over the function of a lock-up clutch, since the hydrodynamic power split produced by the mechanical pressure coupling is bypassed.

The synchronizer clutch can therefore also be referred to as a lock-up clutch.

There are numerous possibilities with regard to the design of the segments on the inner wheel. Preference is given to division into a plurality of segments, in particular three segments, which when arranged next to one another in a row in the circumferential direction form the structural unit of the inner wheel and which are identical in terms of their geometric dimensions and shape. This embodiment offers the advantage of the simple design of the guide for the segments, for example in the form of a triangular profiled shaft or profiled hub. The individual segments are in this case preferably produced from a single-piece bucket wheel which is divided into the individual segments by means of mechanical cutting processes, for example. With regard to the cutting processes employed, it is possible to use various cutting processes, but it is preferable to employ cutting processes which require no further surface treatment and also cause only a low waste of material.

To achieve the radial displaceability of the individual inner-wheel segments and the guidance in the circumferential direction which takes place at least during torque transmission, corresponding means are preferably provided. These means for providing guidance in the circumferential direction and in the radial direction may likewise be designed in various ways. The only crucial factor is that torque transmission be possible between the individual segments of the inner wheel and the guide means and furthermore that mobility in the radial direction be ensured. In the most simple scenario, this is achieved by means of positively locking connections. For this purpose, in the most simple scenario the means have a guide element which is provided with a corresponding profile, preferably in the form of a shaft or hub. The functions of displaceability and of torque transmission are made possible by the design of the mutually facing surface regions on the profiled shaft or hub and the segments of the inner wheel. To ensure the torque transmission, it is preferable to use embodiments which are distinguished by a simple design of the driver elements on at least one of the mutually facing surface regions of the segments of the inner wheel or the profiled shaft or hub. It is conceivable to form projections and recesses on one of the two elements, namely the outer circumference of the guide element and/or inner circumference of the segments, which come into operative connection with substantially complementary recesses and projections on the respectively opposite element, namely the inner circumference of the inner wheel segment or guide element. In this case, it is conceivable for the individual segments of the inner wheel, in terms of mobility in the circumferential direction, either a) to be securely fixed, i.e. without play, or b) prior to transmission of a torque to allow a limited degree of mobility in the circumferential direction around the guide element, i.e. for there to be some degree of play.

This means that in the first case there is a rotationally fixed connection irrespective of the occurrence of a circumferential force, while in the second case a rotationally fixed connection between the segments of the inner wheel and the guide element is only produced under the influence of a circumferential force. The displaceability of the segments in the radial direction is limited by the coupling shell.

One possibility of producing a rotationally fixed connection in the circumferential direction without play consists in linking the segments to the hub via rotary joints. For this purpose, a rotary joint is associated to each segment, in the rear region in the direction of rotation. The action of centrifugal force during rotation effects mobility of the segment about the axis of rotation and therefore, with regard to a component which describes the movement, the radial direction in the pivoting movement.

Preferably, at least three centrifugal bodies are formed by the inner wheel of the hydrodynamic coupling, which bodies are of identical design in terms of their shape and geometric dimensions. These are in this case guided on a profiled shaft or profiled hub which is connected, for example, to the output side when used in a drive train. The guidance preferably takes place, without requiring the influence of a circumferential force, in a rotationally fixed manner in the circumferential direction and displaceably in the radial direction. The profiled shaft or hub in this case has a substantially triangular cross section with rounded corner regions. In the installed position, i.e. when the segments of the inner wheel are being guided on the guide element or the guide means, these corner regions in each case lie in a plane which corresponds to the abutment plane of two inner-wheel segments which are arranged adjacent to one another in the circumferential direction. The abutment plane is in this case characterized by the surface regions, which face one another in the circumferential direction, of the inner-wheel segments coming into contact with one another, or lies in the region of the space between the two surface regions, which face one another in the circumferential direction in the installed position, of the inner-wheel segments when they do not abut one another. Another possibility consists in the driver elements in each case engaging only in one segment. In an embodiment with three segments and a triangular profiled shaft or hub, in each case one corner region of the profiled shaft or hub would then engage in a corresponding recess in a segment.

The concrete design of the driver profile is not linked to a specific embodiment, but rather is made taking account of the number of segments, so that in any situation displaceability thereof in the radial direction and torque transmission are ensured.

According to a further aspect of the invention, the selection of the weight of the individual segments results in the synchronization point being controlled. This offers the advantage that, depending on use requirements, it is possible to drive directly through to an earlier or later time when a certain slip is present.

In a further development of the invention, to increase availability corresponding material pairings are to be selected for the individual clutch elements which can be brought into operative connection with one another in a frictionally locking manner, namely the first clutch element in the form of the inner wheel or the segments of the inner wheel and the second clutch element in the form of the coupling shell. In the process, it should be ensured that the frictional pairing is as far as possible free from wear for a certain operating period. The frictional lock between the inner wheel or the individual segments of the inner wheel and the coupling shell may take place directly or indirectly via an intervening friction element. In the case of direct frictional connection, under the action of centrifugal forces the surfaces of the inner wheel which are formed by the outer circumference of the inner segments are pressed onto the surface formed by the inner circumference of the coupling shell or the surface region which is necessarily formed for the frictional lock. In the other case, it is in each case possible for either the inner wheel, in particular the individual inner-wheel segments, in the region of their outer circumference, or the surface regions which enter an operative connection, in a frictionally locking manner, with the surfaces on the outer circumference of the inner wheel to be provided, on the inner circumference of the coupling shell, with a friction lining. In this case, it is also conceivable for both elements to be designed with a friction lining. The designs with a friction lining offer the advantage that a friction pairing with particularly advantageous properties can be achieved irrespective of the type of material used for the individual elements of the synchronizer clutch, first clutch element or second clutch element, which are formed by the coupling shell and the inner wheel, and at the same time, depending on the material selected, inexpensive production of the elements of the hydrodynamic coupling, inner wheel or coupling disc is achieved. Furthermore, it is also possible to utilize standardized bucket wheels or coupling shells which are already used in other, conventional hydrodynamic couplings and simply to provide these components with a friction lining for the purpose of achieving an expedient design of the friction pairing.

The materials used for the outer wheel and the coupling shell are preferably conventionally employed materials, for example nodular cast iron. By selecting the weight of the centrifugal bodies and therefore of the inner segments, which is likewise material-dependent, it is possible to have a controlled influence on achieving an optimum transmission performance in the start-up range. The aim is to achieve a performance characteristic $\lambda*10^3$ in a range between 2.0 and 2.5 inclusive in nominal operation. However, this presupposes that in the coupling designed according to the invention the centrifugal bodies and therefore the inner-wheel segments have a low mass, for example by weight-optimized design or by selecting a relatively lightweight material, for example being made from aluminum, while the remaining elements may be produced from any desired material. To produce a particularly wear-free friction pairing, the inner wheel is then provided, in the region of its outer circumference, with a friction lining, preferably in the form of bronze, at least in the regions which form a frictionally locking connection with the coupling shell under the action of centrifugal forces. There are numerous possibilities with regard to the arrangement of the frictional lining on the inner wheel and/or on the inner circumference of the coupling shell. The friction lining may be joined to the corresponding elements, namely outer circumference of the inner wheel or outer circumference of the inner-wheel segments and inner circumference of the coupling shell, in a non-positively locking manner, a positively locking manner or by material-to-material bonding.

According to a further aspect of the invention, means for absorbing the axial force on the inner wheel which is produced when the hydrodynamic coupling is filled with an operating medium, for example oil or water, and the rotation of the pump impeller which takes place as a result of the outer wheel being coupled to a drive machine. These means are formed either by guide means, in particular the driver profile on the guide element, for example the profiled shaft or profiled hub, or by an additional, further guide on the inner circumference of the coupling shell. The means for absorbing the axial forces are to be designed to absorb an axial force which acts in both directions, since the axial force acts in an alternating manner.

Figure 2:
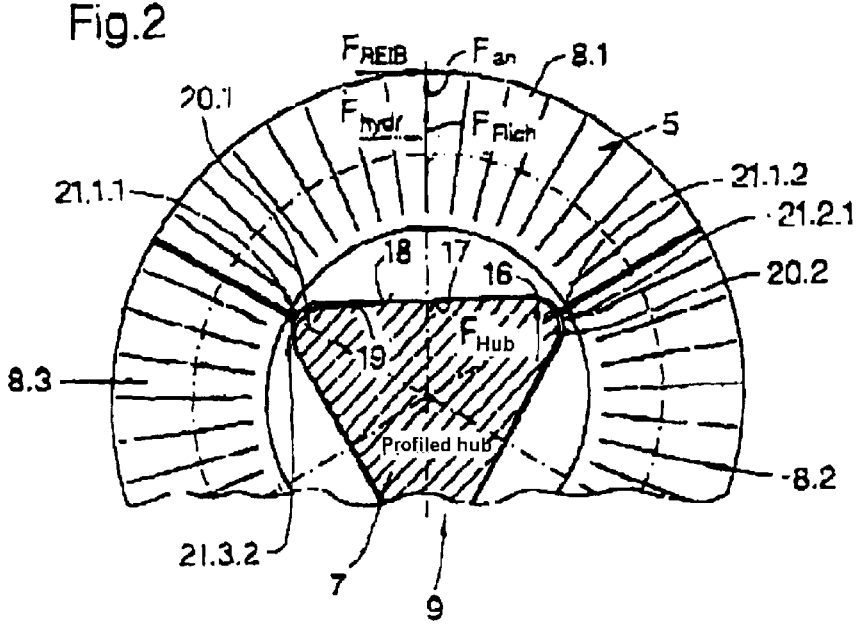
Figure 3:
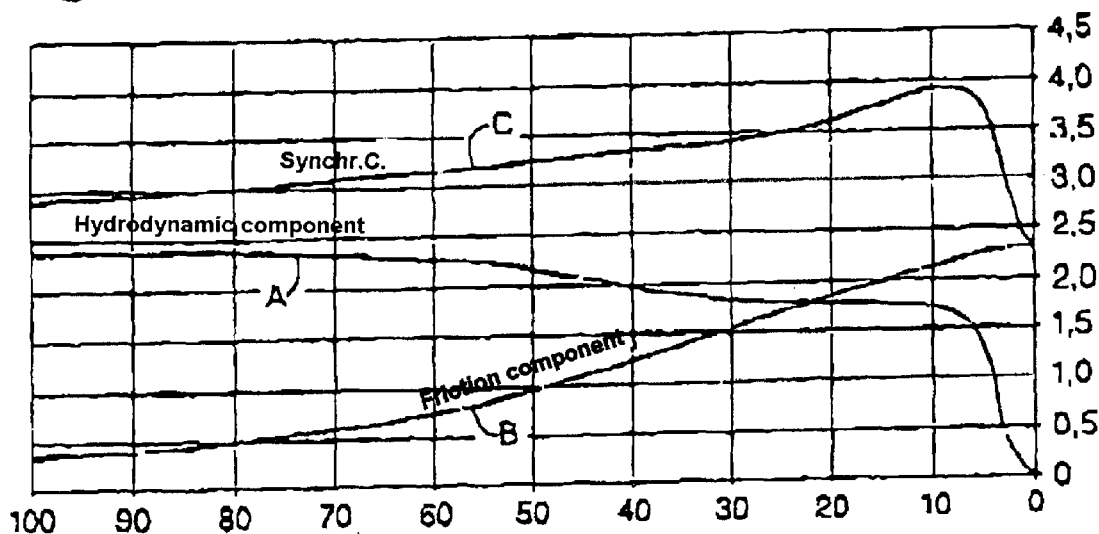
Figure 4:
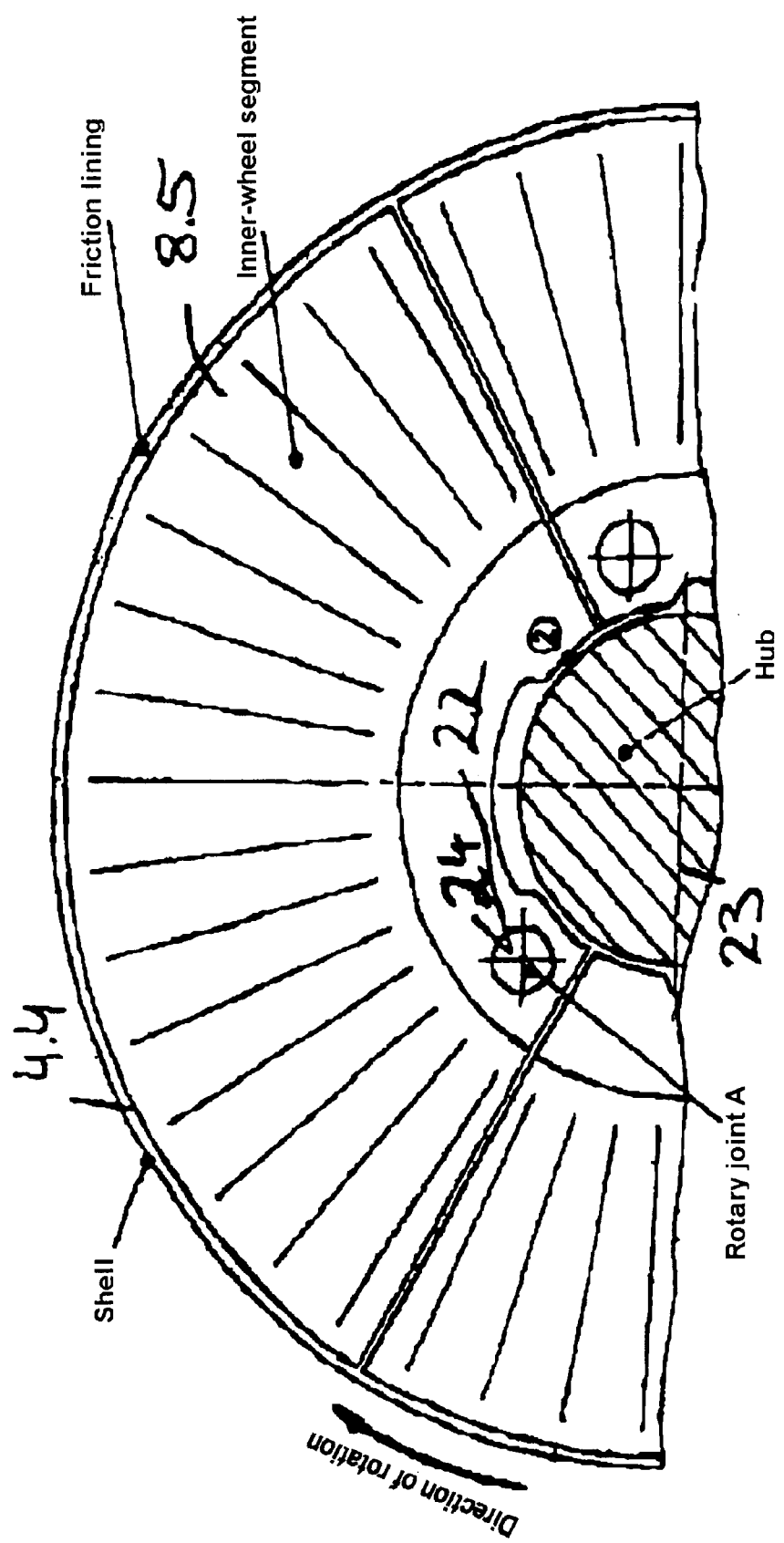

The solution according to the invention is explained below with reference to figures, in which, in detail:

FIGS. 1a and 1b show a diagrammatically simplified illustration of the basic structure of a hydrodynamic coupling which is designed according to the invention, with integrated synchronizer clutch;

FIG. 2 provides a diagrammatic, highly simplified illustration of an embodiment of the guidance between inner-wheel segment and guide element;

FIG. 3 compares the characteristic curves of a hydrodynamic coupling without synchronizer clutch and a hydrodynamic coupling with synchronizer clutch;

FIG. 4 illustrates a further embodiment of guidance between inner-wheel segment and guide element.

FIGS. 1a and 1b show a diagrammatically simplified illustration of the basic structure of a hydrodynamic coupling 1 which is designed in accordance with the invention, in particular a hydraulic transmitter with integrated synchronizer clutch 2, in two views. FIG. 1a shows a radial section, while FIG. 1b shows an embodiment in a view I—I in accordance with FIG. 1a. The hydrodynamic coupling 1, in particular the hydraulic transmitter, comprises two bucket wheels, an outer wheel 3 and an inner wheel 5 which is at least partially enclosed by a coupling shell 4 which is coupled to the outer wheel 3. The outer wheel 3 preferably functions as pump impeller, while the inner wheel 5 is responsible for the function of the turbine wheel. For this purpose, when used in drive trains, the outer wheel 3 is at least indirectly connected in a rotationally fixed manner to the drive side, in particular a drive machine, while the inner wheel 5, which forms the turbine wheel, is coupled to the output side. This applies for power transmission in a drive train in traction mode, as seen from the drive machine to the output side. The synchronizer clutch 2 is integrated in the hydrodynamic coupling 1 and comprises at least two clutch elements which can be brought into operative connection with one another in a frictionally locking manner, namely a first clutch element 6.1 and a second clutch element 6.2. According to the invention, the clutch elements are formed by the coupling shell 4 and the inner wheel 5 of the hydrodynamic coupling. The inner wheel 5 forms the clutch element 6.1 and according to the invention is designed as a multipart centrifugal body. This means that the inner wheel 5 or the clutch element 6.1 is divided into at least two segments in the circumferential direction, which segments, in their entirety, when mounted or guided on a profiled shaft or profiled hub 7, can be moved at least in the radial direction under the action of centrifugal forces. The division is preferably into three individual segments 8.1, 8.2 and 8.3. The individual segments, when arranged next to one another in the circumferential direction, form the structural unit inner wheel 5 and are preferably designed identically to one another in terms of their geometric dimensions. Since torques are to be transmitted via the inner wheel 5 in a hydrodynamic coupling 1, it is necessary for the inner wheel 5, in particular the individual segments, as seen in the circumferential direction, to be guided at least in such a manner that a driver function is ensured, while in the radial direction mobility of the individual segments 8.1 to 8.3 under centrifugal forces is provided. For this purpose, guide means are provided for the individual segments 8.1 to 8.3, which guide means are generally formed by the profiled shaft or profiled hub 7. The latter can be at least indirectly—depending on the function of the inner wheel 5—connected in a rotationally fixed manner to the output side. For this purpose, the profiled shaft or profiled hub 7 has a corresponding driver profile 9.

During the start-up operation when using the hydrodynamic coupling 1 with a drive train, the torque is furthermore for the most part transmitted hydrodynamically via the flow of operating medium which is established between outer wheel 3 and inner wheel 5 when functioning as pump impeller P and turbine wheel T, via the toroidal working space 10. The gentle start-up utilizing the advantages of hydrodynamic power transmission is thereby retained. However, as the output torque increases on account of the centrifugal action which is established on the individual segments 8.1 to 8.3 of the inner wheel during rotation, these segments are pressed increasingly strongly toward the coupling shell 4, until the pressure of the segments 8.1 to 8.3 on the coupling shell 4 results in a frictional lock being produced. In this state, the coupling is synchronized, on account of the interaction between outer wheel 3, that is to say pump impeller P, and coupling shell 4. All the elements rotate at the same speed.

Since, during the start-up operation, the individual segments 8.1 to 8.3 slide on the inner circumference 11 of the coupling shell 4, this means that the individual elements of the friction pairing, at least in the region of the friction lock which is to be formed, must have good sliding and wear properties. The determining factors for the wear resistance of the friction pairing between inner wheel 5 and coupling shell 4 which is established in the synchronizer clutch 2 are the surface pressure which is established, the specific friction capacity and the specific work consumed by friction. Therefore, to minimize wear, either corresponding materials are used for the coupling shell 4 and the inner wheel 5, in particular the individual segments 8.1 to 8.3, or they are provided with a suitable coating. Conventional materials which are customarily used for the production of the individual elements of the hydrodynamic coupling 1, for example nodular cast iron, are preferably employed at least for the production of coupling shell 4 and pump impeller, i.e. outer wheel 3.

The following considerations are taken into account when selecting the material for the inner wheel 5 or the individual inner-wheel segments 8.1 to 8.3. To increase availability, it is advantageous to provide a suitable friction pairing between coupling shell 4 and the segments 8.1 to 8.3 of the inner wheel 5. In this case, coatings with a friction lining 13 are provided either on one of the elements or on both, in particular on the inner circumference 11 of the coupling shell and on the outer circumference 12 of the inner wheel 5, in particular in each case on the outer circumference 12.1 of the segment 8.2 and 12.3 of the segment 8.3. In this case the friction lining may either be arranged only on the inner circumference 11 of the coupling shell or on the outer circumference 12 of the inner wheel 5, for example of the individual segments 8.1 to 8.3, but also it is conceivable for both, i.e. the coupling shell 4 on its inner circumference 11 and the inner wheel 5 on the outer circumference 12 or the individual outer circumferences 12.1 to 12.3 in the individual segments 8.1 to 8.3, to be coated with a suitable friction lining, in which case friction pairings can be produced using identical materials or different materials. Since the type of material used when designing the coupling also has an influence on the effect which is actually employed on account of the centrifugal force, a dimensionless performance characteristic $\lambda = 10^3$ is introduced for the purpose of determining the specific load on the hydrodynamic coupling 1. By means of this characteristic, corresponding performance ranges are defined, a value of <1 defining the lower performance range, a value of between 1–1.5 characterizing the middle performance range and a value of >1.5 representing the upper performance range. In normal, nominal operation, a value of between 2.0 and 2.5 inclusive is desired for the synchronization, i.e. the rotation of the individual bucket wheels—outer wheel 3 and inner wheel 5—at the same rotational speed. The dimensionless performance characteristic $\lambda * 10^3$ then results from the following relationship $$\lambda * 10^3 = P * 10^3 / (P_{rL} D_p^{5} \omega_1^2)$$

where $P_I$=transmittable power
$P_{FL}$=pressure
$D_P$=diameter on the outer circumference of the pump impeller
$\omega_1$=angular velocity To reduce the specific load which can be described by the performance characteristic, the mass of the centrifugal weight has to be kept as low as possible. Since there is generally little which can be changed in terms of the contour of the inner wheel in a hydrodynamic coupling 1, the only option is to select a suitable material. In so doing, it is preferable to select a relatively lightweight material, for example aluminum. However, this material is not generally suitable for a frictional connection, for which reason a corresponding friction lining 13 has to be provided on the outer circumference 12, in particular on the individual outer circumferences 12.1 to 12.3 of the individual segments 8.1 to 8.3 of the inner wheel 5. The friction lining used is a bronze coating which is either cast into or sprayed onto the circumference of the inner wheel 5.

The specific choice of materials for the individual elements—outer wheel 3, inner wheel 5 and coupling shell 4—depends on the particular use and on the desired transmission performance, in particular the synchronization point which is established, and lies within the ability of the appropriate person skilled in the art who is aware of the relationships.

Furthermore, the hydrodynamic power transmission when the hydrodynamic coupling 1 is being filled with an operating medium, for example oil or water, and the pump impeller, preferably the outer wheel 3, is rotating, and coupling is effected to a drive machine, additionally causes an axial force to act on the inner wheel 5. To absorb this axial force acting on the inner wheel 5, in particular the individual segments 8.1 to 8.3 of the inner wheel 5, corresponding means 14 are provided for absorbing the axial force. They are formed either by the guide means 9, in particular the driver profile 9 on the profiled shaft or profiled hub 7, or are absorbed by means of a further, additional guide 15 (not shown) on the circumference of the coupling shell 4. The means for absorbing the axial forces 14 are to be designed to absorb an axial force which acts in both directions, since the axial force acts in an alternating manner. Preferably, as shown in FIGS. 1a and 1b, the means for absorbing the axial forces 14 are arranged on the inner wheel 5.

FIG. 2 provides a highly simplified illustration, on the basis of a view towards the inner wheel 5 of the hydrodynamic coupling 1 as shown in FIG. 1b, of the way in which the forces act during force transmission, surface loads, for clarity, being considered simply as point loads. In this context, for the torque which can be transmitted by the friction on account of the action of centrifugal force, in addition to the transmission of the hydrodynamic moment, the compressive force $F_{An}$, which presses the inner-wheel segments 8.1 to 8.3 onto the coupling shell 4, in particular in the region of its inner circumference 11, is to be exerted. For the most part, this compressive force $F_{An}$ comprises the centrifugal force $F_{Flieh}$. The design of the guide means 9, in particular the profiled shaft or profiled hub 7, causes the hydrodynamic force $F_{hydr}$ and the frictional force $F_{Reib}$ to produce a moment, around the point 16, which additionally increases still further the compressive force $F_{An}$ of the inner-wheel segments 8.1 to 8.3 on the coupling shell 4. The driver profile 9 is designed in such a manner that, on account of the hydrodynamic forces $F_{hydr}$, which act substantially in the circumferential direction, and the design of the driver profile 9 on the inner circumference 17 of the inner wheel 5, in particular 17.1 to 17.3 on the segments 8.1 to 8.3, the profiled shaft or profiled hub 7 is also driven given functional assignment of the function of the turbine wheel T to the inner wheel 5. This means that those regions of profiled shaft or profiled hub 7 and the individual segments 8.1 to 8.3 which are in engagement with one another are designed in such a manner that mobility in the circumferential direction, about the shaft or hub, is not permitted or is permitted only to a greatly restricted extent, yet, furthermore, the mobility of the individual segments 8.1 to 8.n in the radial direction is not impaired. The design of the profiling on the inner wheel 5 and/or on the inner circumferences 17.1 to 17.3 of the individual segments 8.1 to 8.3 and, in complementary fashion, on the profiled shaft or profiled hub 7, is made in such a manner that it is designed symmetrically with respect to the line of symmetry of the inner segment. This means that both profiles in each case have a planar surface region 18 or 19, which come to bear against one another, a stop being provided on both sides of this surface region, which stop is produced by the specific design of the inner-wheel segment 8.1 to 8.3 or, in complementary fashion, of the hub. For this purpose, the profiled shaft or profiled hub 7 preferably has corresponding projections 20.1 to 20.3, in each case one projection 20.1 to 20.3 engaging in the corresponding recess 21.1.1 or 21.1.1 and 21.2.1 of two segments 8.1 and 8.2, which adjoin one another in the circumferential direction, in the region of their abutment plane $E_{SS.1-8.2}$. It would also be conceivable to use a design with projections which in each case engage only in complementary recesses on one segment, in which case, however, the projection is selected in such a manner, in terms of its extent in the radial direction, that a specific, defined shift of the segment along the projection becomes possible. The driver profile 9 is therefore only designed in such a manner that, in the cirumferential direction of the inner wheel 5, torque transmission between inner wheel 5 or the individual segments 8.1 to 8.3 becomes possible, while in the radial direction displaceability of the segments 8.1 to 8.5 with respect to the profiled shaft or profiled hub 7 is possible.

FIG. 3 provides a comparison of various start-up characteristic curves, in the form of the start-up characteristic $\lambda*10^3$, which functions as a performance characteristic, as a function of the slip S which is established over the duration of the start-up operation. In this figure, the characteristic curve which is denoted by A represents a characteristic curve for a conventional hydrodynamic coupling without synchronization, while the characteristic curve which is characterized by B represents the characteristic curve only for the friction component, and C represents the start-up characteristic curve of a hydrodynamic coupling 1 with synchronizer clutch 2 which is designed according to the invention. It can be seen from this figure that, on account of the synchronization action in the low-slip range, in particular at a slip of <10, a considerable increase in the start-up value is achieved.

FIG. 4 provides a greatly simplified, diagrammatic view of a further possibility for producing a rotationally fixed connection between the segments 8.4 of the inner wheel 5.4 by means of a link via, for example, in each case one bolt 22, which forms a rotary joint 24 between the hub 23 and a segment 8.4 of the inner wheel 8.5. The rotary joint 24 allows the segments 8.4 to be driven along in the circumferential direction, and more centrifugal force allows movement of the inner-wheel segments 8.5, which can be described by at least one component in the radial direction, so that a friction lock is produced between inner-wheel segment 8.4 and the coupling shell 4.4. For this purpose, the rotary joint 24 is arranged in the radially inner region of the inner-wheel segment 8.4 and, in the case illustrated, as seen in the direction of rotation, in the rear region of the inner-wheel segment 8.5.

LIST OF REFERENCE SYMBOLS

1 Hydrodynamic coupling
2 Synchronizer clutch
3 Outer wheel
4 Coupling shell
5; 5.4 Inner wheel
6.1 First clutch element
6.2 Second clutch element
7 Profiled shaft or profiled hub
8 Segment of the inner wheel
8.1–8.4 Segments of the inner wheel
9 Guide means, in particular driver profile
10 Toroidal working space
11 Inner circumference of the coupling shell
12 Outer circumference of the inner wheel
12.1–12.3 Outer circumference of the inner-wheel segments 8.1 to 8.3
13 Friction lining
14 Means for absorbing the axial forces
15 Guide
16 Point
17 Inner circumference
18 Planar surface
19 Planar surface
20.1–20.3 Projections on the profiled shaft or profiled hub 7
21.1.1 Recesses
21.1.2 Recesses
21.3.1 Recesses
21.3.2 Recesses
22 Bolt
23 Hub
24 Rotary joint
$E_{S8.1-8.2}$ Abutment plane
$\lambda*10^3$ Performance characteristic, start-up characteristic
$F_{Reib}$ Friction force
$F_{hydr}$ Hydrodynamic force
$F_{An}$ Pressure force
$P_I$ Transmittable power

What is claimed is:

1. A hydrodynamic coupling (1)
   1.1 having at least two bucket wheels, one outer wheel (3) and one inner wheel (5) which is at least partially enclosed by a coupling shell (4) which is coupled to the outer wheel (3);
   1.2 having a synchronizer clutch (2), comprising at least two clutch elements (6.1, 6.2), which can be brought into operative connection with one another, at least indirectly, in a frictionally locking manner; characterized by the following features:
   1.3 the inner wheel (5) is divided into at least two segments (8.1, 8.2, 8.3), which are mounted displaceably in the radial direction and can be connected in a rotationally fixed manner, in the circumferential direction, at least in the direction of rotation, to the drive or output side, at least indirectly;
   1.4 the first clutch element (6.1) is formed by the segments (8.1, 8.2, 8.3) of the inner wheel (5), and the second clutch element is formed by the coupling shell (4).

2. The hydrodynamic coupling (1) as claimed in claim 1, characterized in that the individual segments (8.1, 8.2, 8.3) of the inner wheel (5) are of identical design in terms of their shape and geometric dimensions.

3. The hydrodynamic coupling (1) as claimed in claim 1, characterized in that the individual segments (8.1, 8.2, 8.3) of the inner wheel (5), by means of at least a partial region of the surface regions which can be characterized by their outer circumference (12.1, 12.2, 12.3), form a friction pairing with surface regions on the inner circumference (11) of the coupling shell (4).

4. The hydrodynamic coupling (1) as claimed in claim 1, characterized in that the surface regions on the outer circumference (12.1, 12.2, 12.3) of the segments (8.1, 8.2, 8.3) and/or on the inner circumference (11) of the coupling shell (4) are provided with a friction lining.

5. The hydrodynamic coupling (1) as claimed in claim 4, characterized in that the friction pairing between the surface regions on the outer circumference (12.1, 12.2, 12.3) of the segments (8.1, 8.2, 8.3) and/or on the inner circumference (11) of the coupling shell (4) is formed from the same materials.

6. The hydrodynamic coupling (1) as claimed in claim 4, characterized in that the friction pairing between the surface regions on the outer circumference (12.1, 12.2, 12.3) of the segments (8.1, 8.2, 8.3) and/or on the inner circumference (11) of the coupling shell (4) is formed by different materials.

7. The hydrodynamic coupling (1) as claimed in claim 6, characterized by the following features:
   7.1 in the region of its inner circumference, the coupling shell (4) is produced from nodular cast iron;
   7.2 the segments (8.1, 8.2, 8.3) are manufactured from aluminum and are coated with bronze in the region of their outer circumference (12.1, 12.2, 12.3).

8. The hydrodynamic coupling (1) as claimed in claim 1, characterized by the following features:
   8.1 to provide radial mobility and torque transmission in the circumferential direction, guide means (9) are assigned to the segments (8.1, 8.2, 8.3) of the inner wheel (5);
   8.2 the guide means (9) comprise at least one profiled shaft and/or profiled hub (7) which is provided with a driver profile and, together with a complementary profile on the individual segments (8.1, 8.2, 8.3), allows a positive lock in the circumferential direction.

9. The hydrodynamic coupling (1) as claimed in claim 8, characterized in that the positive lock in the circumferential direction is without influence from radial force.

10. The hydrodynamic coupling (1) as claimed in claim 8, characterized by the following features:
    10.1 the inner wheel (5) is divided into three segments (8.1, 8.2, 8.3);
    10.2 the guide means (9) comprise a profiled shaft or profiled hub (7), which is triangular in cross section and is characterized by three projections (20.1, 20.2, 20.3);
    10.3 the projections (20.1, 20.2, 20.3) engage in complementary recesses in two segments (8.1 and 8.2), which adjoin one another in the circumferential direction, in the region of their abutment plane ES8.1–8.2.

11. The hydrodynamic coupling (1) as claimed in claim 1, characterized in that means are provided for compensating for the axial forces which occur during the hydrodynamic power transmission.

12. The hydrodynamic coupling (1) as claimed in claim 11, characterized in that the means for absorbing the axial forces (14) comprise stops in the region of the internal circumference of the inner wheel (5).

13. The hydrodynamic coupling (1) as claimed in claim 11, characterized in that the means comprise stops on the internal circumference (11) of the coupling shell (4).

* * * * *